United States Patent [19]

Kouno et al.

[11] Patent Number: 4,985,103

[45] Date of Patent: Jan. 15, 1991

[54] METHOD OF FABRICATING CYLINDRICAL CERAMIC LAMINATED BODY

[75] Inventors: Yoshiaki Kouno; Morio Sakai, both of Nagaokakyo, Japan

[73] Assignee: Murata Manufacturing Co., Ltd., Japan

[21] Appl. No.: 450,037

[22] Filed: Dec. 13, 1989

[30] Foreign Application Priority Data

Dec. 13, 1988 [JP] Japan .................. 63-315408

[51] Int. Cl.$^5$ ............................................. B32B 18/00
[52] U.S. Cl. ...................................... 156/184; 156/89; 156/191; 156/230; 156/239; 156/247; 156/249; 156/289; 29/25.42; 361/321
[58] Field of Search ............... 156/89, 184, 191, 230, 156/239, 247, 249, 289; 29/25.42; 361/310, 321 CC, 321 F, 321 R, 321 T, 321 P

[56] References Cited

U.S. PATENT DOCUMENTS

| | | | |
|---|---|---|---|
| 3,004,197 | 10/1961 | Rodriguez et al. | 156/89 |
| 3,380,854 | 4/1968 | Robinson | 361/321 T |
| 4,325,763 | 4/1982 | Utsumi et al. | 156/89 |
| 4,424,615 | 1/1984 | Wakino | 29/25.42 |
| 4,475,967 | 10/1984 | Kanai et al. | 156/89 |

OTHER PUBLICATIONS

"Process for Personalizing Green Ceramic Sheet with Dimensional Stability", IBM Tech. Disc. Bulletin, vol. 23, No. 7A, Dec. 1980.

*Primary Examiner*—Caleb Weston
*Attorney, Agent, or Firm*—Ostrolenk, Faber, Gerb & Soffen

[57] ABSTRACT

A method of fabricating a cylindrical ceramic laminated body includes the steps of forming a ceramic green sheet on a carrier film, laminating the ceramic green sheet on a base plate having a flat upper surface, releasing the ceramic green sheet from the carrier film, applying a joining agent on the ceramic green sheet, and then winding the ceramic green sheet while releasing it from the base plate, thereby obtaining a cylindrical laminated roll.

8 Claims, 6 Drawing Sheets

METHOD OF FABRICATING CYLINDRICAL CERAMIC LAMINATED BODY

BACKGROUND OF THE INVENTION

1. Field of the Invention

The present invention relates to a method of fabricating a cylindrical ceramic laminated body which can be used as, for example, a cylindrical ceramic multilayer capacitor.

2. Description of the Prior Art

Fabrication of a cylindrical ceramic multilayer capacitor as an example of a cylindrical ceramic laminated body, has heretofore employed fabricating methods such as spray processes or rolling and isostatic pressing processes.

In the spray process, ceramic slurry is applied to the periphery of a bar-shaped core by spraying and is dried, thereby forming a ceramic layer on the outer surface of the core. The surface of this ceramic layer is then subjected to masking. Next, an electrode paste is applied by means of a spray and is dried. The above described step of applying and drying the ceramic slurry and applying and drying the electrode paste are repeated a plurality of times, thereby to obtain a cylindrical ceramic laminated body having a structure in which electrode paste is arranged between ceramic layers. This cylindrical ceramic laminated body is sintered, thereby allowing a cylindrical ceramic sintered body to be obtained.

The above described spray process has various disadvantages. When the ceramic slurry and the electrode paste are applied by spray, a significant amount of material is scattered to the surroundings. Consequently, large amounts of coating material are required resulting in significant material loss.

Furthermore, when the electrode paste is applied by spray, the electrode paste material adheres to the reverse side of the masked surface. As a result, an electrode having an exact shape is not easily formed. In addition, air becomes trapped between the masked surface and the sprayed paste. Consequently, it is difficult to form elaborate and uniformly thick ceramic and electrode layers.

On the other hand, in the rolling and isostatic pressing process depicted in FIG. 13, ceramic green sheets 17 and 18 having electrodes 15 and 16 printed on one of their surfaces are prepared. As shown in FIG. 13, a plurality of ceramic green sheets 17 and 18 are laminated, to be wound around a bar-shaped core 19. A laminated roll 20 is obtained by this winding. As shown in FIG. 14, the laminated roll 20 is then packed in a resin film under vacuum. The vacuum packed laminated roll 20 is pressurized in a tank for isostatic pressing (not shown). Consequently, the ceramic green sheets 17 and 18 laminated are joined to each other by the applied pressure.

The above described rolling and isostatic pressing process has several disadvantages. The isostatic pressing causes a flow of material. Therefore the laminated roll 20 is liable to be crumpled or deformed around its peripheral surface. Moreover, the shape of the electrode is altered by applying pressure. Accordingly, it is difficult to obtain the desired properties. Furthermore, when a plurality of laminated rolls 20 are formed along the longitudinal direction of a single core 19, as is often done in order to increase productivity, each of the laminated rolls 20 can be deformed if the core 19 is deflected from its original orientation. In addition, the core 19 are projects outward from the inside of the laminated roll 20. Thus, when hydrostatic pressure is increased, a vacuum pack 21 shown in FIG. 14 is capable of being damaged. Consequently, it is difficult to join the ceramic green sheets 17 and 18 to each other by means of strong pressure.

SUMMARY OF THE INVENTION

Accordingly, an object of the present invention is to overcome the various disadvantages in the above described conventional methods so that laminated ceramic green sheets can be reliably pressed by applying pressure without crumpling or deforming the peripheral surfaces and so that cylindrical ceramic laminated bodies can be fabricated at low cost.

A method of fabricating a cylindrical ceramic laminated body according to the present invention comprises the steps of forming a ceramic green sheet on one major surface of a carrier film, laminating the above ceramic green sheet on a base plate having a flat upper surface, applying to the ceramic green sheet a joining agent containing a solvent capable of dissolving a binder contained within said ceramic green sheet, and cylindrically winding the ceramic green sheet while releasing the same from the base plate.

In accordance with a preferred aspect, the present invention provides a method comprising the steps of forming a ceramic green sheet on one major surface of a carrier film, laminating the above ceramic green sheet on a base plate having a flat upper surface, laminating onto the ceramic green sheet another ceramic green sheet by means of a joining agent containing a solvent capable of dissolving a binder contained within the ceramic green sheets, obtaining a ceramic laminated body by repeating the step of laminating a ceramic green sheet a suitable number of times, applying the above joining agent on the uppermost ceramic green sheet, and cylindrically winding the above laminated body while releasing the same from the base plate.

In the fabricating method according to the present invention, the laminated ceramic green sheets are joined to each other by means of a joining agent without applying any pressure, merely by winding the ceramic laminated body which releases said body from the base material. Accordingly, large pressure is not required unlike the rolling and isostatic pressing process. Consequently, the laminated body is not deformed, crumpled or torn by the pressure, thereby allowing heightened dimensional precision. In particular, when an electrode is formed within the laminated body, the position and shape of the electrode are precisely controlled, thereby allowing properties corresponding to design values to be obtained.

Furthermore, fabrication according to the present invention does not require a special pressing step. Accordingly, the number of steps can be reduced, thereby reducing production cost. In addition, the ceramic green sheet is hardly deformed. Accordingly, multiple cylindrical ceramic laminated bodies having uniform thicknesses can be fabricated from a large area flat ceramic laminated body. In addition, positioning of the laminated ceramic green sheet using the base plate facilitates printing an electrode paste on the laminated ceramic green sheet. Consequently, even if the laminating precision of the ceramic green sheet is low, the positioning precision of the electrode can be heightened which increases manufacturing throughput.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Referring now to FIGS. 1 to 8, a method of fabricating a cylindrical ceramic laminated body according to an embodiment of the present invention is described. The present embodiment is applied to a method of fabricating a cylindrical ceramic multilayer capacitor.

Figure 1:
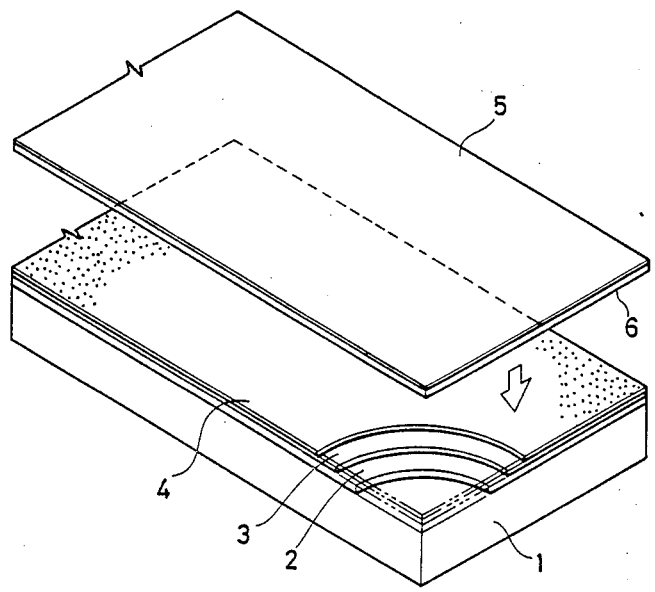
FIG. 1 is a perspective view for explaining the step of laminating a ceramic green sheet on a base plate in a fabricating method according to an embodiment of the present invention.

As shown in FIG. 1, a base plate 1 having high rigidity made of metal and sintered ceramics is first prepared. An elastic material such as silicon rubber is applied to the upper surface of this base plate 1, thereby to form an elastic material layer 2. A film 3 for releasing is affixed on said elastic material layer 2, and then a joining agent, containing a solvent capable of dissolving a binder contained in a ceramic green sheet, is applied to the entire surface of this film 3 by screen process printing or the like, to form a joining agent layer 4.

Furthermore, a ceramic green sheet 6 with a carrier film 5 is laminated on the joining agent layer 4 on the base plate 1 such that the carrier film 5 is on the upper side. This ceramic green sheet 6 is formed by applying ceramic slurry on the carrier film 5 and drying the same by a doctor blade process.

Figure 2:
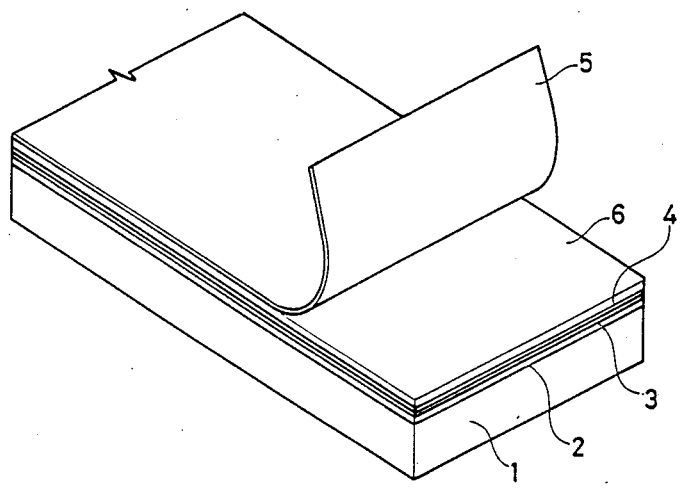
FIG. 2 is a perspective view for explaining the step of releasing a carrier film adhered to the ceramic green sheet laminated.

As shown in FIG. 2, the carrier film 5 is then released from the ceramic green sheet 6, thereby completely exposing said ceramic green sheet 6.

Figure 3:
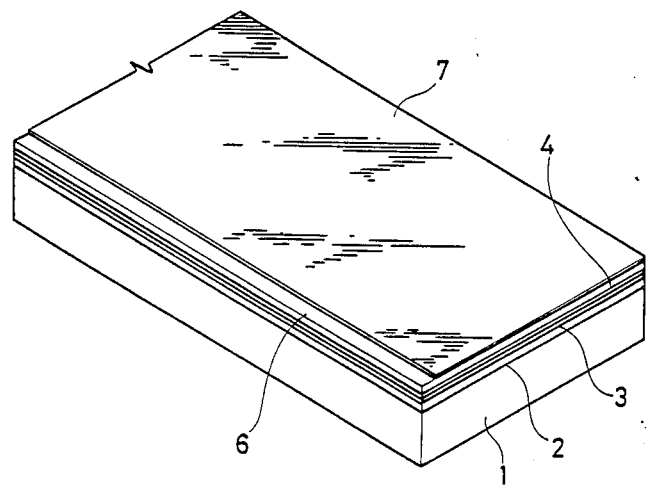
FIG. 3 is a perspective view for explaining the step of printing an electrode paste.

As shown in FIG. 3, an electrode paste is applied to that part of the upper surface of the ceramic green sheet 6 exposed by screen printing process or the like, to form an electrode 7 having a predetermined shape. At this time, the ceramic green sheet 6 is positioned and held utilizing the rigidity of the base plate 1. Thereafter, the joining agent layer 4 and the electrode 7, together with the base plate 1, are heated (for example, for approximately two minutes at 150° C.) and are dried.

Figure 4:
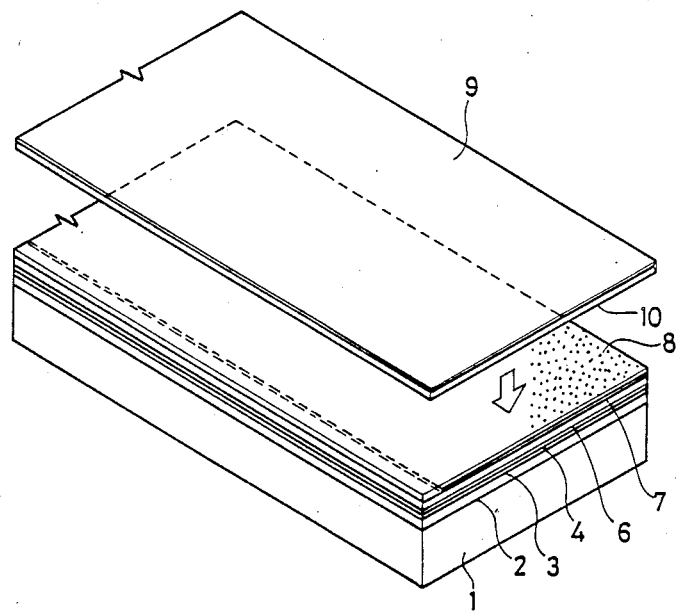
FIG. 4 is a perspective view for explaining the step of laminating another ceramic green sheet.

As shown in FIG. 4, a joining agent layer 8 is then formed on the electrode 7, and then another ceramic green sheet 10 backed with a carrier film 9 is laminated. The carrier film 9 is then released thereby exposing the ceramic green sheet 10 as described above in the description of FIG. 2.

Figure 5:
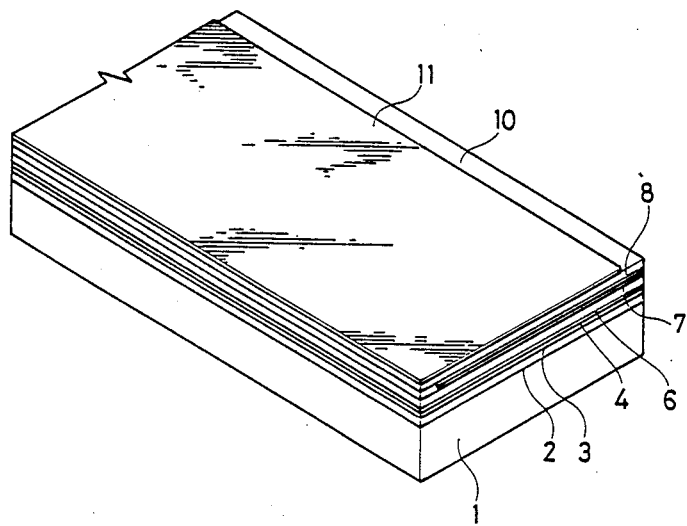
FIG. 5 is a perspective view showing a plurality of laminated ceramic green sheets.
Figure 6:
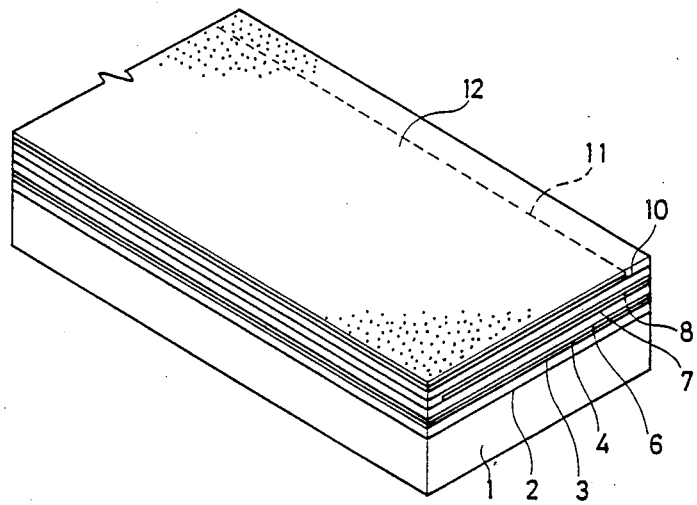
FIG. 6 is a perspective view showing a joining agent applied on the uppermost ceramic green sheet.

Thereafter, as shown in FIG. 5, an electrode 11 having a predetermined shape is formed on the upper surface of the ceramic green sheet 10, and then the joining agent layer 8 and the electrode 11 are heated and dried.

The above described steps as shown in FIGS. 2, 4, and 5 are repeated a plurality of times to increase the number of ceramic green sheets laminated as required.

When the laminating heating and drying processes of a required number of ceramic green sheets are terminated, the electrode 11 on the uppermost ceramic green sheet 10 is coated with a joining agent containing a solvent capable of dissolving a binder contained in the ceramic green sheet, thereby forming an additional joining agent layer 12.

Figure 7:
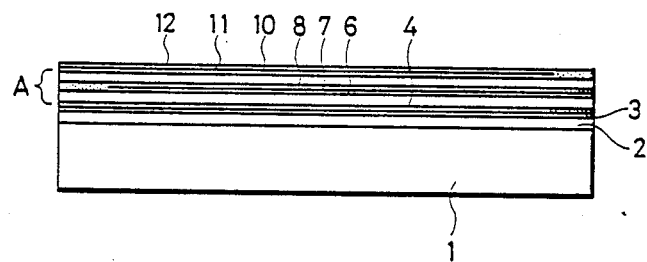
FIG. 7 is a front view illustrating a laminated body shown in FIG. 6.

When lamination of the ceramic green sheets and the electrodes using the above described procedure has been terminated, a flat ceramic laminated body A, as shown in FIG. 7, having joining agent layers 4 and 12 formed in its upper and lower parts and having electrodes 7 and 11 formed in its inside, will have been constructed on the film 3.

Figure 8:
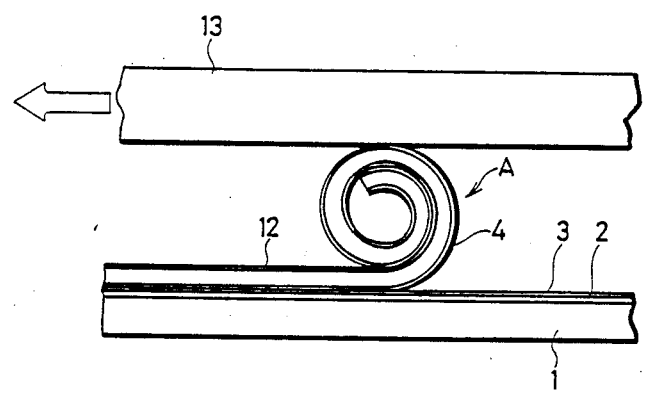
FIG. 8 is a side elevational view for explaining the winding of the laminated body.

As shown in FIG. 8, ceramic laminated body A on the base plate 1 is then cylindrically wound using an upper plate 13 while simultaneously releasing said ceramic laminated body A from the end from which the winding process began. As depicted, the ceramic laminated body A is released from the film 3. Binders contained in the ceramic green sheets 6 and 10 are dissolved by the joining agent layer 8 formed in between said sheets in order to join them to each other. In addition, the lowermost joining agent layer 4 is joined to the uppermost or innermost joining agent layer 12 during the winding process. Once wound, joining agent layer 4 becomes the outermost layer.

Winding performance may be enhanced by employing a bar shaped core (not shown) with a releasing film 3 on its surface centered within the ceramic laminated body A and parallel to the winding direction.

Figure 9:
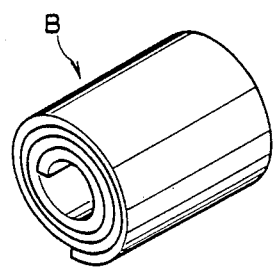
FIG. 9 is a perspective view illustrating a laminated roll.
Figure 10:
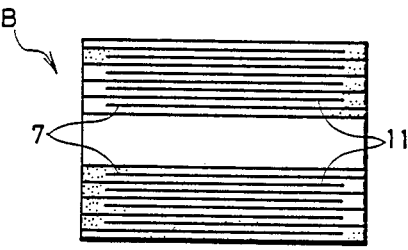
FIG. 10 is a cross-sectional view showing the laminated roll shown in FIG. 9.

Through the above described steps, a cylindrical ceramic laminated body B having the appearance and the cross section as shown in FIGS. 9 and 10 is obtained. If dried, the ceramic laminated body B forms a completed cylindrical ceramic multilayer capacitor. It is also possible to cut the ceramic laminated body B before drying to a desired size or length, and to then subject the same to shape processing such as bending.

A method of fabricating a cylindrical ceramic laminated body according to another embodiment of the present invention is now described.

Figure 11:
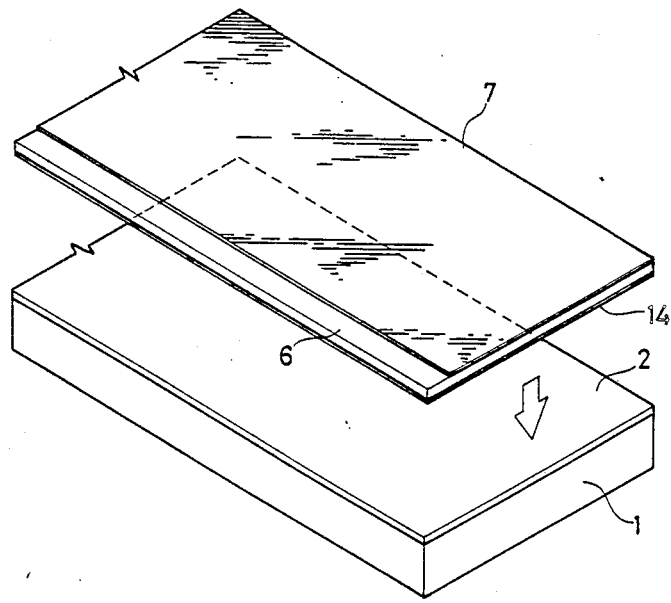
FIG. 11 is a perspective view for explaining a fabricating method according to another embodiment of the present invention, showing the lamination of a ceramic green sheet having an electrode paste printed thereon.
Figure 13:
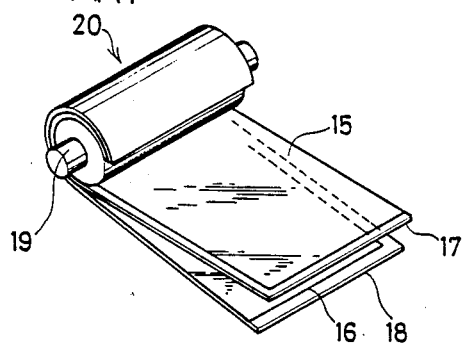
FIG. 13 is a perspective view for explaining a conventional fabricating method, that is, a rolling and isostatic pressing process.
Figure 14:
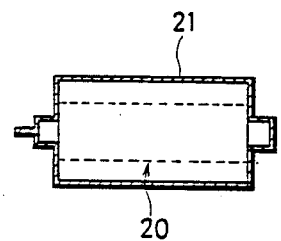
FIG. 14 is a schematic cross-sectional view illustrating a laminated roll packed under vacuum in the conventional rolling and isostatic pressing process.

In the above described embodiment, the ceramic green sheet 6 backed with the carrier film 5 is laminated through the joining agent layer 4, and then the carrier film 5 is released so that the electrode 7 can be formed to a predetermined shape by a screen printing process or the like on the ceramic green sheet 6. Alternatively, as shown in FIG. 11, a ceramic green sheet 6 may be laminated by positioning an electrode 7, which has been previously formed thereon, on a base plate 1 having an elastic material layer 2 formed thereon. In this case, the releasing film 3 and the joining agent layer 4 are not required because the carrier film 14 upon which the ceramic green sheet 6 rests functions as a film for releasing.

In the subsequent lamination of ceramic green sheets, according to this alternate embodiment, the ceramic green sheet 10 having the electrode 11 previously formed thereon may be laminated through the joining agent layer 8 with it being released from the carrier film 9, as in the embodiment first described. More specifically the ceramic laminated body A is cylindrically wound using only the uppermost joining agent layer 12, so that the lowermost ceramic green sheet 6 is joined to the uppermost ceramic green sheet 10, the carrier film having been released from ceramic green sheet 6 and remaining on base plate 1.

Figure 12:
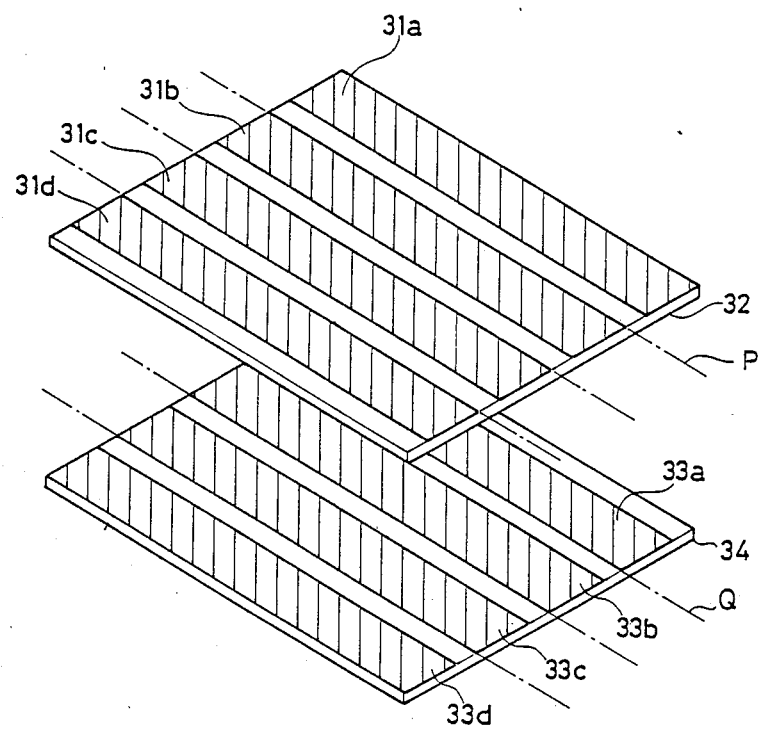
FIG. 12 is a perspective view for explaining a fabricating method according to still another embodiment of the present invention, showing the lamination of a mother ceramic green sheet.

According to the present invention, a laminated roll obtained through a single winding step is cut in the direction of the length of the laminated roll, thereby allowing a plurality of laminated rolls to be fabricated. Such an embodiment will be described with reference to FIG. 12.

A mother ceramic green sheet 32 having a plurality of electrode pastes 31a to 31d printed on its upper surface and a mother ceramic green sheet 34 having a plurality of electrode pastes 33a to 33d printed on its upper surface are laminated on a base plate (not shown) in the same manner as that in the above described embodiments. The obtained laminated body is wound, thereby allowing a mother laminated roll to be obtained. This laminated roll is cut to portions corresponding to portions along dot and dash lines P and Q shown in FIG. 12, thereby allowing a plurality of laminated rolls to be obtained.

The joining agent used in the above described embodiments is made of the same raw material system as that of the ceramic green sheet and contains a solvent capable of dissolving binders contained in the ceramic green sheet and the electrode paste.

Although in the above described embodiments, a plurality of ceramic green sheets are laminated and wound, it should be noted that the present invention includes a method of winding a single ceramic green sheet on a base plate. More specifically, a cylindrical laminated body can also be obtained by winding a single ceramic green sheet.

Additionally, although description was made of the embodiments applied to a method of fabricating a cylindrical ceramic multilayer capacitor, it should be noted that the present invention is not limited to the application of the method of fabricating a cylindrical multilayer capacitor. The present invention can be generally applied to a method of fabricating electronic parts using a cylindrical ceramic laminated body constituted by a plurality of ceramic green sheets.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of fabricating a cylindrical ceramic laminated body, comprising the steps of:
    forming a ceramic green sheet on one major surface of a carrier film;
    laminating said ceramic green sheet on a base plate having a flat upper surface;
    releasing said ceramic green sheet from said carrier film;
    applying a joining agent containing a solvent capable of dissolving a binder contained in the ceramic green sheet to the upper surface of the ceramic green sheet; and
    cylindrically winding said ceramic green sheet while releasing the same from the base plate.

2. A method of fabricating a cylindrical ceramic laminated body, comprising the steps of:
    forming a ceramic green sheet on one major surface of a carrier film;
    laminating said ceramic green sheet on a base plate having a flat upper surface;
    releasing said ceramic green sheet from said carrier film;
    laminating on said ceramic green sheet another ceramic green sheet through a joining agent containing a solvent capable of dissolving a binder contained in the ceramic green sheets;
    obtaining a ceramic laminated body by repeating said step of laminating and releasing the ceramic green sheets a selected number of times;
    applying a joining agent to the upper surface of the uppermost ceramic green sheet; and
    cylindrically winding said laminated body while releasing the same from the base plate.

3. The method according to claim 2, which further comprises the step of applying an electrode paste to the upper surface of a laminated ceramic green sheet.

4. The method according to claim 2, which further comprises the step of applying an electrode paste to the upper surface of a ceramic green sheet prior to lamination.

5. The method according to claim 2, wherein the laminated body is wound around a bar-shaped core in said winding step.

6. The method according to claim 2, wherein an elastic material layer is formed on the upper surface of said base plate prior to laminating said ceramic green sheet.

7. The method according to claim 6, wherein a release agent layer is formed on the upper surface of said elastic material layer prior to laminating said ceramic green sheet.

8. The method according to claim 7, wherein said joining agent is applied on said release agent layer prior to laminating said ceramic green sheet.

* * * * *